Oct. 29, 1968  C. D. DICKINSON ET AL  3,408,231

METHOD OF MAKING FLEXIBLE ELECTRODES

Filed Dec. 21, 1964

INVENTORS
CLAYTON D. DICKINSON
JEROME J. PEREZ
IRVING SHEINHARTZ

BY
R. J. Frank
ATTORNEY though under certain conditions a laminated nickel sheet may prove more suitable for a given application.

United States Patent Office
3,408,231
Patented Oct. 29, 1968

3,408,231
METHOD OF MAKING FLEXIBLE ELECTRODES
Clayton D. Dickinson, Port Washington, N.Y., Jerome J. Perez, Fairfield, Conn., and Irving Sheinhartz, Bayside, N.Y., assignors to General Telephone and Electronics Laboratories, Inc., a corporation of Delaware
Filed Dec. 21, 1964, Ser. No. 419,935
5 Claims. (Cl. 136—29)

ABSTRACT OF THE DISCLOSURE

A method of making flexible negative electrodes wherein a nickel-containing substrate is placed in a mixture of aluminum oxide, aluminum powder and a halide. The substrate and mixture are then heated in a reducing atmosphere to form a nickel aluminide coating metallurgically bonded to the substrate. The substrate is next placed in a caustic solution to dissolve out the aluminum thereby forming a negative electrode.

---

Figure 1:
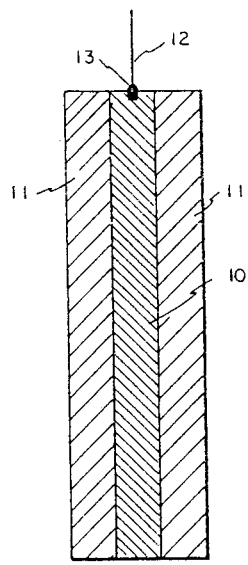

This invention relates to negative electrodes for alkaline batteries and to methods of making such electrodes.

Alkaline batteries may, in general, be divided into two types, primary and secondary. Negative electrodes for primary batteries usually comprise a metal or metal alloy in sheet form and are relatively simple to manufacture. However, primary battery electrodes have the disadvantage that they are used until completely discharged and thereafter cannot be recharged or used again. Secondary negative electrodes are rechargeable but are generally of porous construction. As a result, they are quite fragile and have relatively poor conductivity causing their performance at high charging and drain rates to be less than satisfactory. Further, the present methods of making secondary electrodes are somewhat complex and expensive and, unless carefully controlled, may result in warped electrodes.

The negative electrodes used in secondary cells are commonly made of metals such as iron, cadmium, or zinc. Another material, which has been proposed for use as a negative electrode is Raney nickel. In fabricating such an electrode, Raney nickel is prepared in a powder or paste form, pressed and sintered, and then deposited on a porous substrate or in the perforated pockets of nickel plated steel. Since the substrate is porous and because the Raney nickel coating is not bonded to the porous substrate, the electrical conductivity and mechanical strength of such electrodes are relatively low. Further, they are not flexible and will break under slight bending stresses.

Accordingly, it is an object of our invention to provide an improved negative electrode which may be used in both primary and secondary alkaline batteries.

Another object is to provide a negative electrode for alkaline batteries which employs a core having relatively high electrical conductivity and good mechanical properties.

Still another object is to provide a negative electrode which is flexible and may be fabricated by a simple, efficient and relatively inexpensive process.

Yet another object is to provide a negative secondary electrode having a fully dense nickel core rather than the relatively mechanically weak porous sheet heretofore employed.

A further object is to provide a negative electrode which will permit the construction of a cell having greater capacity for a given weight or volume and which will provide higher drain rates than are now available in alkaline cells employing nickel of hydrogen negative electrodes.

In the present invention, a negative electrode is provided which comprises a metallic substrate or core having an electrochemically active coating metallurgically bonded to the substrate. The active coating consists of nickel containing atomic hydrogen and some aluminum dispersed therein. Preferably the metallic core is formed of fully dense nickel in order to obtain maximum conductivity and mechanical strength. However, a nickel alloy sheet having additions of chromium, cobalt, lithium, titanium or similar metals may also be used as the electrode core.

The active coating is metallurgically bonded to the nickel core by processes to be described hereinafter in such manner that there is a sharp line of demarcation between the coating and the substrate. By metallurgically bonded it is meant that at the interface the distance between the atoms of the substrate and the coating is on the order of an atomic diameter.

The negative electrode is formed by bringing aluminum into contact with the surface of the nickel-containing core at an elevated temperature thereby interdiffusing the aluminum and nickel to form a layer of nickel aluminide ($Ni_2Al_3$). After the nickel aluminide layer has been formed to the desired thickness on the core, the structure is placed in a caustic solution to dissolve out the diffused aluminum. The dissolution step produces a layer of active nickel metallurgically bonded to the nickel-containing core. This layer of active nickel has atomic hydrogen and some residual aluminum distributed therethrough. A portion of the atomic hydrogen is adsorbed onto the nickel layer and the remainder is contained within the atomic lattice of the nickel.

The resultant structure can be used as a negative electrode in either a primary or secondary cell. It is flexible and therefore can be used in a variety of cell configurations.

Figure 2:
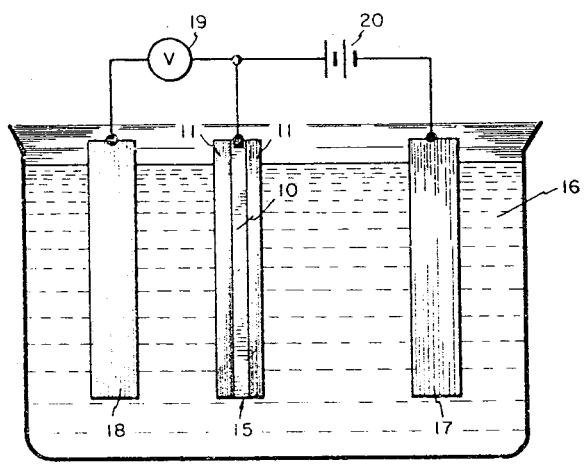

The above objects of and the brief introduction to the present invention will be more fully understood and further objects and advantages will become apparent from a study of the following description in connection with the drawings, wherein:

FIG. 1 is a schematic diagram of the electrode showing the active coating bonded to the substrate, and FIG. 2 is a diagram showing an alkaline test cell employing the electrode.

Referring to FIG. 1, there is shown a negative electrode comprising a solid substrate or core 10 having an electrochemically active nickel coating 11 metallurgically bonded thereto. A lead 12 is secured to the core by a tab 13. The coating 11 consists of essentially of nickel having between 10 and 50 atom percent hydrogen and up to 15 weight percent aluminum uniformly distributed throughout the nickel. In most cases, the electrodes contained approximately 50 atom percent hydrogen and between 8 and 15 weight percent aluminium. Although a fully dense nickel core is preferred since it provides greatest electrical conductivity and mechanical strength, the core may have some porosity and still be acceptable. However, it shall be noted that even should a porous core be employed the coating 11 does not impregnate the pores but is bonded to the surface of the substrate 10.

In making the negative electrode a 100 percent dense nickel sheet having a thickness of about 0.010 inch was selected for use as the substrate. As previously explained, a nickel-containing alloy may also be employed. The thickness of the core is not critical and depends upon the conductivity of the core material and the desired capacity of the electrode. In general, the capacity of the electrode increases with the thickness of the coating and therefore to obtain an electrode having maximum volume, the thinnest core consistent with good mechanical strength and current capacity should be used.

The nickel sheet was placed in a pack consisting of a mixture of approximately 58 percent aluminum oxide ($Al_2O_3$), 40 percent aluminum powder and 2 percent ammonium chloride ($NH_4Cl$). The composition of the mixture is not critical and wide variations are permissible. Other halides, such as ammonium flouride ($NH_4F$) and sodium flouride ($NaF$) may also be used in place of ammonium chloride. The nickel substrate and surrounding mixture were heated in a reducing atmosphere for 8 hours at 800° C. and then cooled to room temperature. The resulting structure consisted of a nickel core 10 covered on both sides by an approximately 0.008 inch layer 11 of nickel aluminide ($Ni_2Al_3$). (In addition, trace amounts of $NiAl_3$ are sometimes formed on the surface of the $Ni_2Al_3$.) A reducing atmosphere composed of hydrogen was used in producing the nickel aluminide coating although an inert atmosphere such as argon may also be employed.

The thickness of the coating is determined by the duration and temperature of the diffusion process, temperatures in the range 625° to 900° C. giving satisfactory results. Specific examples showing the relationship between time, temperature and coating thickness are given in Table I.

TABLE I

| Duration (Hours) | Temperature (° C.) | Coating Thickness (Inch) |
| --- | --- | --- |
| 8 | 850 | 0.008 |
| 16 | 850 | 0.012 |
| 16 | 750 | 0.008 |

The coated nickel core was next immersed in a solution containing a 6 normal sodium hydroxide solution at a temperature of 80° C for about 16 hours. At the end of this period at least 85 percent of the aluminum was dissolved out of the structure forming a negative electrode. The reaction of the aluminum with the sodium hydroxide solution removes the aluminum from the $Ni_2Al_3$ leaving behind the nickel containing a large concentration of defects as a direct result of the removal of aluminum. Part of these defects contain atomic hydrogen released by the reaction of the aluminum with the sodium hydroxide. It has been found that the dissolution step may be carried out at temperatures in the range 20° to 100° C. for periods of from 1 to 32 hours and that potassium hydroxide may be used in place of sodium hydroxide.

The resultant electrode comprised a solid, non-porous nickel substrate or core having an electrochemically active nickel coating and can be used as a negative electrode in either a primary or secondary cell. Its capacity both as a reversible and irreversible electrode is determined by the amount of nickel that has been combined to form $Ni_2Al_3$. When the electrode is used in a primary cell, this nickel plus the residual aluminum and hydrogen in the electrode are utilized to provide electrical capacity. When used as the negative electrode in a secondary cell, the amount of hydrogen that can be reversibly adsorbed during reduction and oxidized during discharge is proportional to the active nickel. In the latter case however only the hydrogen is utilized electrochemically.

An electrode 15 having a width of 0.5 inch, a length of 2.5 inches and a 0.008 inch active coating on each side was formed as described. As shown in FIG. 2, this electrode (termed the working electrode) was placed in an electrolyte 16 consisting of a 33 percent solution of potassium hydroxide together with a solid nickel counterelectrode 17 and a mercuric oxide reference electrode 18. The potential of the working electrode 15 was measured with respect to the reference electrode 18 with a volt-meter 19 while the cell was discharged at a constant current imposed by an external D.C. source 20. It was found that the potential of the working electrode 15 dropped from −0.9 volt to −0.7 volt while delivering 1000 milliampere hours to the load.

The electrode 15 was also tested to determine its behavior in secondary rechargeable batteries by repeatedly charging and discharging it in the cell of FIG. 2. It was found that the working electrode 15 was capable of delivering approximately 150 milliampere hours while its potential dropped from −0.9 to −0.7 volts. During the first few cycles most of the aluminum still present in the coating 11 is removed leaving a nickel coating containing only atomic hydrogen. Since the aluminum is removed, the electrode can combine with more of the hydrogen generated during the cycling process and therefore the secondary capacity of the working electrode is augmented.

The negative eelctrodes described are extremely flexible and can literally be twisted into almost any configuration without damage. For example, electrodes 0.02 inch thick were bent double with a zero bend radius without damage to their mechanical or electrochemical integrity. Batteries can therefore be designed to utilize electrodes of more complex and efficient shape than has heretofore been possible. Further, the irreversible capacity of these electrodes is about 1 ampere per gram of auminum gained during coating and the reversible capacity is about 150 milliampere hours per gram of aluminum. In addition, the high electrical conductivity of the solid nickel core permits current densities as high as 0.25 amperes per square inch with a primary negative capacity of 940 milliampere hours per gram of aluminum. A capacity of only 1000 milliampere hours per gram of aluminum was obtained at the conventional rate of 0.025 ampere per square inch. Thus, there is very little change in capacity over a wide range of discharge rates.

An electrode was prepared by the method just described except that the pack method was not used for forming the nickel aluminide. In lieu thereof, the nickel sheet was rolled between two aluminum sheets to form a metallic bond. The nickel sheet and bonded aluminum were then heated in a reducing (or inert) atmosphere at a temperature of 1100° F. to form $Ni_2Al_3$. Preferably, temperatures below 1200° F. are used in this method although temperatures as high as 1600° F. may be used.

As many changes could be made in the above described processes and many different embodiments could be made without departure from the scope thereof, it is intended that all matter contained therein shall be interpreted as illustrative and not in a limiting sense.

What is claimed is:

1. A method of making a flexible, negative electrode comprising the steps of
   (a) placing a substrate consisting essentially of nickel in a mixture of aluminum oxide, aluminum powder and a halide and heating said substrate and mixture in a reducing atmosphere to a temperature in the range 625° to 900° C. to form a nickel aluminide coating metallurgically bonded to said substrate, and
   (b) placing said nickel aluminide coated substrate in a caustic solution to dissolve out the aluminum to form a negative electrode.

2. A method of making a flexible, negative electrode comprising the steps of
   (a) placing a substrate consisting essentially of fully dense nickel in a mixture consisting of approximately 2 percent aluminum oxide, 40 percent aluminum powder and 58 percent of a halide,
   (b) heating said substrate and mixture in a reducing atmosphere to a temperature in the range 625° to 900° C. to form a nickel aluminide coating metallurgically bonded to said substrate, and
   (c) placing said nickel aluminide coated substrate in a caustic solution at a temperature of about 80° C. until essentially at least 85 weight percent of the aluminum is dissolved out thereby forming a negative electrode.

3. The method of making a flexible negative electrode disclosed in claim 2 wherein the nickel aluminide coating is bonded to the nickel substrate by heating to about 800° C. for approximately 8 hours in a hydrogen atmosphere.

4. The method of making a flexible negative electrode disclosed in claim 2 wherein the halide is selected from the group consisting of ammonium chloride, ammonium fluoride and sodium fluoride.

5. A method of making a flexible, negative electrode comprising the steps of
   (a) rolling a sheet consisting essentially of nickel between two aluminum sheets to form a metallic bond therebetween,
   (b) heating said sheet and aluminum to a temperature of approximately 1100° C. in a reducing atmosphere to form a nickel aluminide coating on said substrate, and
   (c) dissolving the aluminum out of said nickel aluminide coating to form a negative electrode.

References Cited

UNITED STATES PATENTS

| | | | |
|---|---|---|---|
| 3,096,205 | 7/1963 | De Guisto | 117—107.2 |
| 3,248,787 | 5/1966 | Plust et al. | 136—120 |
| 3,286,684 | 11/1966 | Aves | 117—107.2 |
| 3,345,197 | 10/1967 | Martini et al. | 117—107.2 |
| 2,884,688 | 5/1959 | Herz | 29—182 |
| 3,068,157 | 12/1962 | Vielstich et al. | 136—86 X |
| 3,081,366 | 3/1963 | Belove | 136—6 |
| 3,140,172 | 7/1964 | Coad | 75—135 X |
| 3,202,544 | 8/1965 | Vielstich | 136—6 |
| 3,239,380 | 3/1966 | Berchielli | 136—6 |

OTHER REFERENCES

Gray et al.: The Defect Solid State, 1957, pp. 402–403, Scientific Library.

WINSTON A. DOUGLAS, *Primary Examiner.*

A. SKAPARS, *Assistant Examiner.*